United States Patent
Kurosawa

(10) Patent No.: US 11,254,167 B2
(45) Date of Patent: Feb. 22, 2022

(54) PNEUMATIC TYRE

(71) Applicant: Sumitomo Rubber Industries, Ltd., Kobe (JP)

(72) Inventor: Dai Kurosawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 166 days.

(21) Appl. No.: 16/692,799

(22) Filed: Nov. 22, 2019

(65) Prior Publication Data
US 2020/0189319 A1 Jun. 18, 2020

(30) Foreign Application Priority Data
Dec. 14, 2018 (JP) .............................. JP2018-234693

(51) Int. Cl.
*B60C 11/01* (2006.01)
*B60C 13/00* (2006.01)
*B60C 15/06* (2006.01)
*B60C 9/02* (2006.01)
*B60C 15/00* (2006.01)

(52) U.S. Cl.
CPC ............ *B60C 11/01* (2013.01); *B60C 9/0292* (2013.01); *B60C 13/002* (2013.01); *B60C 15/06* (2013.01); *B60C 2015/009* (2013.01)

(58) Field of Classification Search
CPC ..... B60C 9/0292; B60C 13/02; B60C 13/002; B60C 2015/061; B60C 15/0607
USPC ........................................................ 152/549
See application file for complete search history.

(56) References Cited

U.S. PATENT DOCUMENTS

| 5,637,162 A * | 6/1997 | Rhyne .................. B60C 3/04 |
| | | 152/209.14 |
| 2001/0018943 A1* | 9/2001 | Shida .................. B60C 15/0607 |
| | | 152/539 |

(Continued)

FOREIGN PATENT DOCUMENTS

| EP | 2505388 A1 | 10/2012 |
| EP | 3275698 A1 | 1/2018 |
| JP | 2017-170937 A | 9/2017 |

OTHER PUBLICATIONS

Extended European Search Report, dated Apr. 21, 2020, for European Application No. 19208935.7.

*Primary Examiner* — Timothy Kennedy
*Assistant Examiner* — Farah Taufiq
(74) *Attorney, Agent, or Firm* — Birch, Stewart, Kolasch & Birch, LLP

(57) ABSTRACT

A pneumatic tyre includes a tread portion, two axially spaced sidewall portions extending radially inwardly from the tread portion, at least one of the sidewall portions being provided with a side protector that protrudes axially outwardly and having an inner end located radially outwardly of a tyre-maximum-width position, and two axially spaced bead portions connected to radially inward of the respective sidewall portions. Each bead portion includes a bead apex rubber having an outer end in the tyre radial direction being located radially inwardly of the tyre-maximum-width position. A radial length of a tyre inner region from a bead baseline to the outer end of each bead apex rubber is in a range of from 0.8 to 1.2 times a radial length of a tyre outer region from a radially outermost position of the tread portion to the inner end of the side protector.

18 Claims, 3 Drawing Sheets

(56) References Cited

U.S. PATENT DOCUMENTS

| | | | |
|---|---|---|---|
| 2006/0180259 A1* | 8/2006 | Kajita | B60C 13/00 |
| | | | 152/541 |
| 2009/0188601 A1* | 7/2009 | Kuniyasu | B60C 15/06 |
| | | | 152/541 |
| 2015/0298510 A1* | 10/2015 | Shimizu | B60C 15/0027 |
| | | | 152/541 |
| 2017/0267034 A1 | 9/2017 | Kageyama | |
| 2018/0162178 A1* | 6/2018 | Matsumoto | B60C 13/02 |

* cited by examiner

PNEUMATIC TYRE

BACKGROUND ART

Field of the Disclosure

The present disclosure relates to pneumatic tyres, and more particularly to a pneumatic tyre having a side protector provided on a sidewall portion.

Description of the Related Art

The following Patent Document 1 discloses a pneumatic tyre which includes a sidewall portion provided with a plurality of side protectors protruding outwardly in the tyre axial direction. Such a pneumatic tyre can prevent cut damage on the sidewall portion due to contacts with rocks and bushes.

Patent Document

[Patent Document 1] Japanese Unexamined Patent Application Publication 2017-170937

SUMMARY OF THE DISCLOSURE

In such a pneumatic tyre, the thick side protectors tend to enhance stiffness of a radially outer region of the sidewall portion locally. Thus, strain during driving tends to concentrate on a region located radially inwardly of the side protectors, especially the bead portion, resulting in deterioration of durability of the bead portion and the like.

In view of the above problems, the present disclosure has an object to provide a pneumatic tyre capable of improving durability.

According to one aspect of the disclosure, a pneumatic tyre includes a tread portion, two axially spaced sidewall portions extending inwardly in a tyre radial direction from the tread portion, at least one of the sidewall portions being provided with a side protector that protrudes outwardly in a tyre axial direction, the side protector having an inner end in the tyre radial direction located outwardly in the tyre radial direction of a tyre-maximum-width position, and two axially spaced bead portions connected to inward in the tyre radial direction of the respective sidewall portions, each bead portion including a bead apex rubber, the bead apex rubber having an outer end in the tyre radial direction being located inwardly in the tyre radial direction of the tyre-maximum-width position, wherein a length in the tyre radial direction of a tyre inner region from a bead baseline to the outer end of each bead apex rubber is in a range of from 0.8 to 1.2 times a length in the tyre radial direction of a tyre outer region from an outermost position of the tread portion in the tyre radial direction to the inner end of the side protector.

In another aspect of the disclosure, a tyre middle region which is a region between the tyre inner region and the tyre outer region may have a length in the tyre radial direction in a range of from 5% to 25% of a tyre section height.

In another aspect of the disclosure, the tyre-maximum-width position may be located on a middle region in the tyre radial direction of a tyre middle region which is a region between the tyre inner region and the tyre outer region.

In another aspect of the disclosure, a tyre middle region which is a region between the tyre inner region and the tyre outer region may have a difference of thickness between a maximum thickness thereof and a minimum thickness thereof being equal to or less than 15% of the maximum thickness.

In another aspect of the disclosure, the bead portions may include bead cores, and in each bead portion, the bead apex rubber may include a main apex that extends outwardly in the tyre radial direction from an outer surface in the tyre radial direction of the bead core, and an outer apex disposed outwardly in the tyre axial direction of the main apex.

In another aspect of the disclosure, the outer apex may have an outer end in the tyre radial direction located outwardly in the tyre radial direction of an outer end in the tyre radial direction of the main apex.

In another aspect of the disclosure, the pneumatic tyre may further include at least one carcass ply extending between the bead portions, wherein the at least one carcass ply, in each bead portion, may extend between the main apex and the outer apex.

In another aspect of the disclosure, the at least one carcass ply may include a main portion extending between the bead cores of the bead portions through the tread portion and the sidewall portions, and axially spaced two turn-up portions turned up around the respective bead cores from axially inside to the outside of the tyre, and lengths in the tyre radial direction between outer ends in the tyre radial direction of the turn-up portion and the bead base line may be equal to or less than 50% of a tyre section height.

In another aspect of the disclosure, the at least one carcass ply may include a first carcass ply and a second carcass ply arranged adjacently on the first carcass ply, and wherein in each bead portion, the outer end of the turn-up portion of the first carcass ply may be away from the outer end of the turn-up portion of the second carcass ply in the tyre radial direction.

In another aspect of the disclosure, in each bead portion, the tyre-maximum-width position may be located between the outer end of the first carcass ply and the outer end of the second carcass ply in the tyre radial direction.

In another aspect of the disclosure, in each bead portion, a distance in the tyre radial direction between the outer ends of the first carcass ply and the second carcass ply may be equal to or more than 15 mm.

In another aspect of the disclosure, under a normal condition such that the tyre is mounted on a standard wheel rim and inflated to a standard pressure but loaded with no tyre load, the carcass ply may have a single radius curvature profile in a radial region between a first height position and a second height position, where the first height position is defined as a position away from the tyre-maximum-width position outwardly in the tyre radial direction at a radial length that is twice of a radial length from the inner end of the side protector to the tyre-maximum-width position, and the second height position is defined as a position away from the tyre-maximum-width position inwardly in the tyre radial direction at a radial length that is twice of a radial length from the outer end of the bead apex rubber to the tyre-maximum-width position.

In another aspect of the disclosure, the tread portion may include a belt layer extending in the tyre axial direction, and wherein the side protector may have an outer end in the tyre radial direction located inwardly in the tyre radial direction of an extended line in which the belt layer is extended smoothly outwardly in the tyre axial direction.

In another aspect of the disclosure, the side protector may have a protruding height of from 3 to 7 mm.

DESCRIPTION OF THE PREFERRED EMBODIMENTS

An embodiment of the present disclosure will be explained below with reference to the accompanying drawings.

Figure 1:
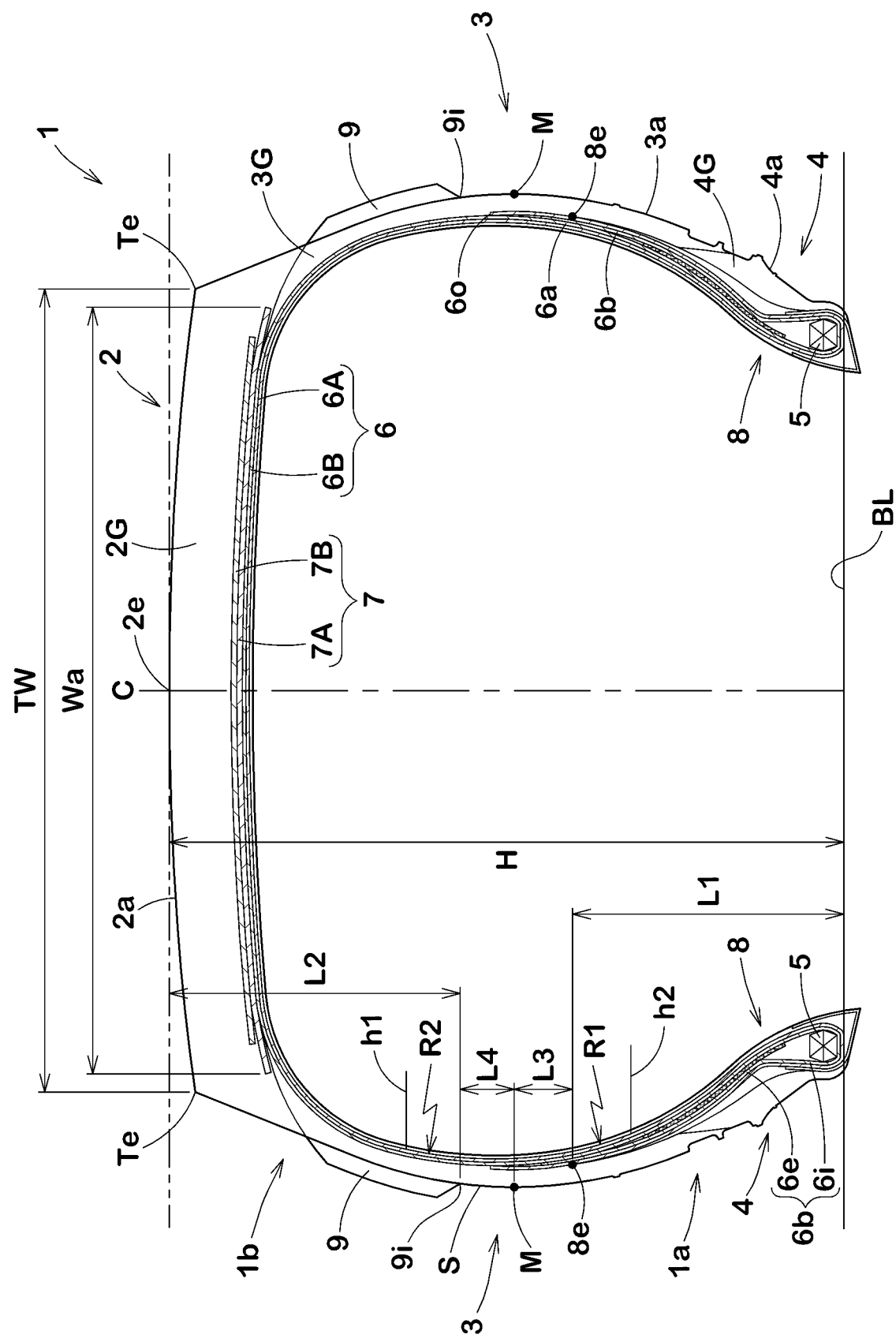
FIG. 1 is a cross-sectional view of a pneumatic tyre according to one embodiment of the present disclosure.

FIG. 1 illustrates a cross-sectional view of a pneumatic tyre 1 (hereinafter, simply referred to as "tyre") 1 according to one embodiment of the present disclosure under a normal condition.

As a preferred aspect, FIG. 1 shows a passenger car tyre which may be suitably mounted onto 4WD vehicles capable of driving not only dry asphalt road conditions but also off-road conditions such as debris and mud. Note that the present disclosure, for example, may be embodied as a heavy-duty tyre.

As used herein, the "normal condition" is such that the tyre 1 is mounted onto a standard wheel rim (not illustrated) with a standard pressure but loaded with no tyre load. As used herein, unless otherwise noted, dimensions of respective portions of the tyre 1 are values measured under the normal condition.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The tyre 1 according to the present disclosure includes a tread portion 2, two axially spaced sidewall portions 3 extending inwardly in the tyre radial direction from the tread portion 2, two axially spaced bead portions 4 connected to inward in the tyre radial direction of the respective sidewall portions 3. An annular bead core 5 is disposed in a respective one of the bead portions 4.

The tyre 1, for example, further includes a tread rubber layer 2G defining a ground-contact surface 2a of the tread portion 2, sidewall rubber layers 3G defining outer surfaces 3a of the respective sidewall portions 3, and clinch rubber layers 4G defining outer surfaces 4a of the respective bead portions 4. The tread rubber layers 2G, the sidewall rubber layers 3G and the clinch rubber layers 4G may be made of respective conventional rubber compositions.

The tyre 1, in the present embodiment, further includes a carcass 6 extending between the bead portions 4 and 4, and a belt layer 7 disposed in the tread portion 2.

The carcass 6 includes at least one carcass ply. In the present disclosure, the carcass 6 includes a first carcass ply 6A and a second carcass ply 6B arranged adjacently on the first carcass ply 6A. The first carcass ply 6A, in the present embodiment, is arranged inwardly in the tyre radial direction of the second carcass ply 6B. Note that the first carcass ply 6A may be arranged outwardly in the tyre radial direction of the second carcass ply 6B.

Each of the carcass plies 6A and 6B, in the present embodiment, includes a main portion 6a and two axially spaced turn-up portions 6b. The main portion 6a extends between the bead cores 5 of the bead portions 4 through the tread portion 2 and the sidewall portions 3. Each turn-up portion 6b is connected to the main portion 6a and turned up around a respective one of the bead cores 5 from axially inside to the outside of the tyre. Each turn-up portion 6b, in the present embodiment, has an outer end 6o in the tyre radial direction terminating within a respective one of the sidewall portions 3. Further, each turn-up portion 6b, for example, includes an inner portion 6i inclined inwardly in the tyre axial direction from the bead core 5 toward outwardly in the tyre radial direction, and an outer portion 6e connected to the inner portion 6i and inclined outwardly in the tyre axial direction toward outwardly in the tyre radial direction. Note that each turn-up portion 6b is not limited to the above aspect.

The carcass plies 6A and 6B, for example, comprise carcass cords (not illustrated) coated with a topping rubber. The carcass cords according to the present embodiment are oriented at an angle of from 75 to 90 degrees with respect to the tyre equator C, for example. As the carcass cords, steel cords and organic fiber cords such as polyester, nylon, rayon, aramid and the like may be used.

The belt layer 7 includes one or more belt plies. In the present embodiment, the belt layer 7 includes an inner belt ply 7A and an outer belt ply 7B which are adjacent with one another. The belt plies 7A and 7B, for example, include belt cords (not illustrated) which are oriented at an angle of from 10 to 35 degrees with respect to the tyre equator C. The belt plies 7A and 7B are arranged such that belt cords of the respective plies cross with one another. As the belt cords, steel cords are preferably employed, for example, but high elasticity organic fiber cords such as aramid, rayon and the like can also be employed.

The inner belt ply 7A, in the present embodiment, has an axial width greater than that of the outer belt ply 7B. It is preferable that the width Wa in the tyre axial direction of the inner belt ply 7A is in a range of from 80% to 100% of the tread width TW. Alternatively, the inner belt ply 7A, for example, may have a narrower width than the outer belt ply 7B.

The tread width TW shall mean an axial distance between tread edges Te. The tread edges Te are the axial outermost edges of the ground contacting patch of the tyre 1 which occurs under the normal condition with a standard tyre load when the camber angle of the tyre is zero.

The standard tyre load is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

In each bead portion 4, a bead apex rubber 8 is disposed. Further, each bead apex rubber 8 has an outer end 8e in the tyre radial direction which is located inwardly in the tyre radial direction of the tyre-maximum-width position M. As used herein, the "tyre-maximum-width position" M is a position where a profile line S of an outer surface 3a of each sidewall portion 3 protrudes outermost in the tyre axial direction. As used herein, the "profile line" S is a smooth curve line which is defined by eliminating partial protrusions and recesses, e.g., serrated patterns for decoration, ribs for identifying trademark, side protectors described later and the like, on the outer surface 3a of each sidewall portion 3a.

At least one of the sidewall portions 3 is provided with at least one side protector 9 which protrudes outwardly in the tyre axial direction from the profile line S. Further, the side protector 9 has an inner end 9i in the tyre radial direction which is located outwardly in the tyre radial direction of the tyre-maximum-width position M. In the present embodiment, at least one side protector 9 is provided on both sidewall portions 3 and 3.

The following definitions are applicable to the present disclosure.

"Tyre inner region" 1a is a region from a bead baseline BL to the outer end 8e of each bead apex rubber 8.

"Tyre outer region" 1b is a region from an outermost position 2e of the tread portion 2 in the tyre radial direction to the respective inner ends 9i of the side protectors 9 of the sidewall portions.

The "outermost position" 2e is an intersection where the ground-contact surface 2a of the tread portion 2 cross the tyre equator C. In case that a groove element (not illustrated) is provided on the tyre equator C, however, the ground-contact surface 2a is defined based on a virtual ground contact surface which is obtained by being filled up the groove element completely.

In the present embodiment, a length L1 in the tyre radial direction of the tyre inner region 1a is in a range of from 0.8 to 1.2 times a length L2 in the tyre radial direction of the tyre outer region 1b in each sidewall portion 3. The above feature may bend intensively a portion of and around the tyre-maximum-width position M which is located between high stiffness regions of the tyre inner region 1a and the tyre outer region 1b, reducing strain of the bead portions 4. Hence, the tyre 1 according to the present disclosure can exhibit better durability. In order to further improve durability, it is preferable that the length L1 of the tyre inner region 1a is approximately same as the length L2 of the tyre outer region 1b, e.g., the length L1 being in a range of from 0.9 to 1.1 times the length L2.

In order to achieve the above-mentioned effect further, it is preferable that a length L3 in the tyre radial direction between the tyre-maximum-width position M and the outer end 8e of the bead apex rubber 8 is in a range of from 0.8 to 1.2 times a length L4 in the tyre radial direction between the tyre-maximum-width position M and the inner end 9i of the side protector 9, in each sidewall portion 3.

It is preferable that the main portion 6a of the first carcass ply 6A has a single radius of curvature R1 (i.e., having a single radius curvature profile) in a radial region from a first height position h1 to a second height position h2. The first height position h1 is defined as a position away from the tyre-maximum-width position M outwardly in the tyre radial direction at a radial length that is twice of a radial length L4 from the inner end 9i of the side protector 9 to the tyre-maximum-width position M. The second height position h2 is defined as a position away from the tyre-maximum-width position M inwardly in the tyre radial direction at a radial length that is twice of a radial length L3 from the outer end 8e of the bead apex rubber 8 to the tyre-maximum-width position. This aspect enables to uniformize strain of the first carcass ply 6A around the tyre-maximum-width position M which is to be bent intensively, improving durability further. Here, "single radius of curvature" includes radii of curvature with the difference (Ra1-R1b) between the maximum radius curvature R1a and the minimum radius curvature R1b being equal to or less than 10% of the maximum radius curvature R1a in a region between the first height position h1 and the second height position h2. Further, in the same viewpoint, it is preferable that the main portion 6a of the second carcass ply 6B is profiled so as to have a single radius of curvature R2 from the first height position h1 to the second height position h2.

Figure 2:
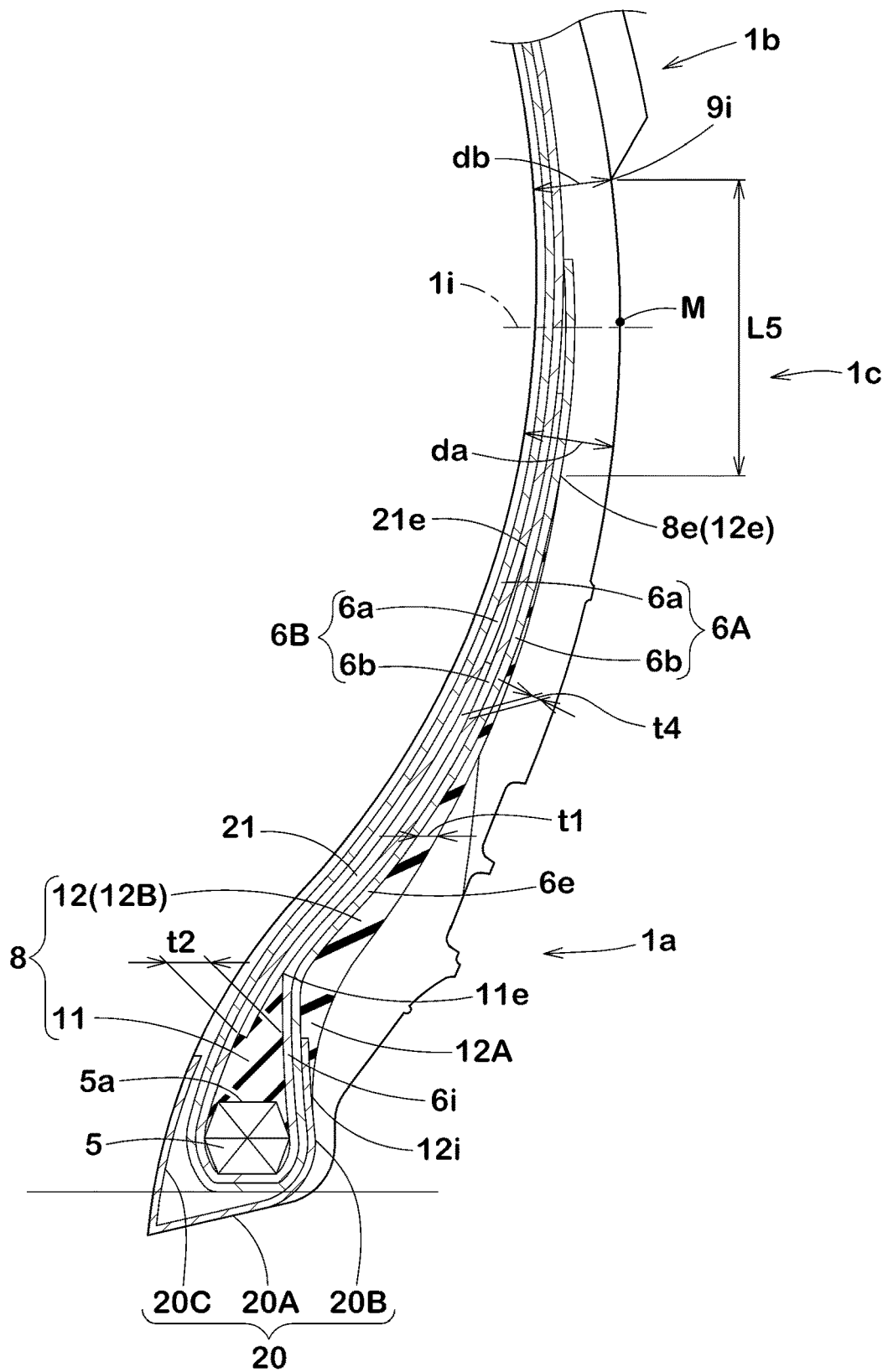
FIG. 2 is a partial enlarged view of a sidewall portion and a bead portion of FIG. 1.

FIG. 2 is a partial enlarged view of FIG. 1. As illustrated in FIG. 2, it is preferable that a tyre middle region 1c which is a region between the tyre inner region 1a and the tyre outer region 1b has a length L5 in the tyre radial direction in a range of from 5% to 25% of the tyre section height H (shown in FIG. 1). When the length L5 of the tyre middle region 1c is less than 5% of the tyre section height H, lengths L1 and L2 of the tyre inner region 1a and the tyre outer region 1b, respectively, become larger, these mass increase, and thus large load may apply to the tyre middle region 1c. When the length L5 of the tyre middle region 1c exceeds 25% of the tyre section height H, strain occurs on a portion away from the tyre-maximum-width position M, and thus it may be difficult to reduce strain of the bead portions 4. From the above viewpoint, it is more preferable that the length L5 of the tyre middle region 1c is in a range of from 10% to 20% of the tyre section height H.

In order to bend the tyre-maximum-width position M intensively, it is preferable that the tyre-maximum-width position M is located on a middle region in the tyre radial direction of the tyre middle region 1c. Here, the "middle region" in the tyre radial direction of the tyre middle region 1c is a 10% region of the length L5 of the tyre middle region 1c centered at the center location 1i of the tyre middle region 1c in the tyre radial direction.

It is preferable that the difference of thickness of the tyre middle region 1c between the maximum thickness da and the minimum thickness db is equal to or less than 15% of the maximum thickness da. Thus, since stiffness difference of the tyre middle region 1c tends to be small over the tyre radial direction, uniform flexibility of and around the tyre-maximum-width position M can be ensured. In order to further improve the above effect, the difference between the maximum thickness da and the minimum thickness db is equal to or less than 10%, more preferably equal to or less than 5%, of the maximum thickness da.

Each bead apex rubber 8 according to the present embodiment includes a main apex 11 and an outer apex 12. The main apex 11, for example, extends outwardly in the tyre radial direction from an outer surface 5a in the tyre radial direction of the bead core 5. The outer apex 12, for example, is disposed outwardly in the tyre axial direction of the main apex 11.

The main apex 11, in the present embodiment, is disposed between the main portions 6a and the turn-up portions 6b of the carcass plies 6A and 6B. The outer apex 12, in the present embodiment, is disposed outwardly in the tyre axial direction of the turn-up portions 6b. The outer apex 12 can maintain high durability by suppressing the turn-up portions 6b being bent outwardly excessively in the tyre axial direction. In the present embodiment, the carcass plies 6A and 6B extend between the main apex 11 and the outer apex 12 in each bead portion 4.

The outer end 12e in the tyre radial direction of the outer apex 12, for example, is located outwardly in the tyre radial direction of the outer end 11e in the tyre radial direction of the main apex 11. Such an outer apex 12 may exhibit the above-mentioned effect effectively.

It is preferable that the outer apex 12 has complex elastic modulus $E_1^*$ in a range of from 15 to 39 MPa. Note that complex elastic modulus $E_2^*$ of the main apex 11 is not limited but is preferably equal to the complex elastic modulus $E_1^*$ of the outer apex 12. As used herein, complex elastic modulus of rubber is measured based on the Japanese Industrial Standard JIS-K-6394 using a viscoelastic spectrometer manufactured by IWAMOTO SEISAKUSYO under the following conditions:

initial strain of 10%;
amplitude of plus/minus 2%;
frequency of 10 Hz;
tensile deformation mode; and
temperature of 70 degrees C.

The outer apex 12, for example, includes a first portion 12A having a thickness t1 in the tyre axial direction increasing gradually outwardly in the tyre radial direction, and a second portion 12B connected to the first portion 12A and having a thickness t1 in the tyre axial direction decreasing gradually outwardly in the tyre radial direction. The first portion 12A, in the present embodiment, is in contact with the inner portion 6i of the turn-up portions 6b. The second portion 12B, in the present embodiment, is in contact with the outer portion 6e of the turn-up portions 6b.

The outer apex 12 has an inner end 12i in the tyre radial direction which is located outwardly in the tyre radial direction of the outer surface 5a of the bead core 5, for example. Further, the inner end 12i of the outer apex 12, in the present embodiment, is located inwardly in the tyre radial direction of the outer end 11e of the main apex 11. Such an outer apex 12 enables to make the bead portions 4 small in stiffness difference over the tyre radial direction.

The main apex 11, in the present embodiment, is configured as a triangular cross-sectional shape having a thickness t2 in the tyre axial direction decreasing gradually outwardly in the tyre radial direction from the outer surface 5a of bead core 5. The outer end 11e of the main apex 11 is located proximate to the outer end of the inner portion 6i of the turn-up portions 6b in the tyre radial direction.

Figure 3:
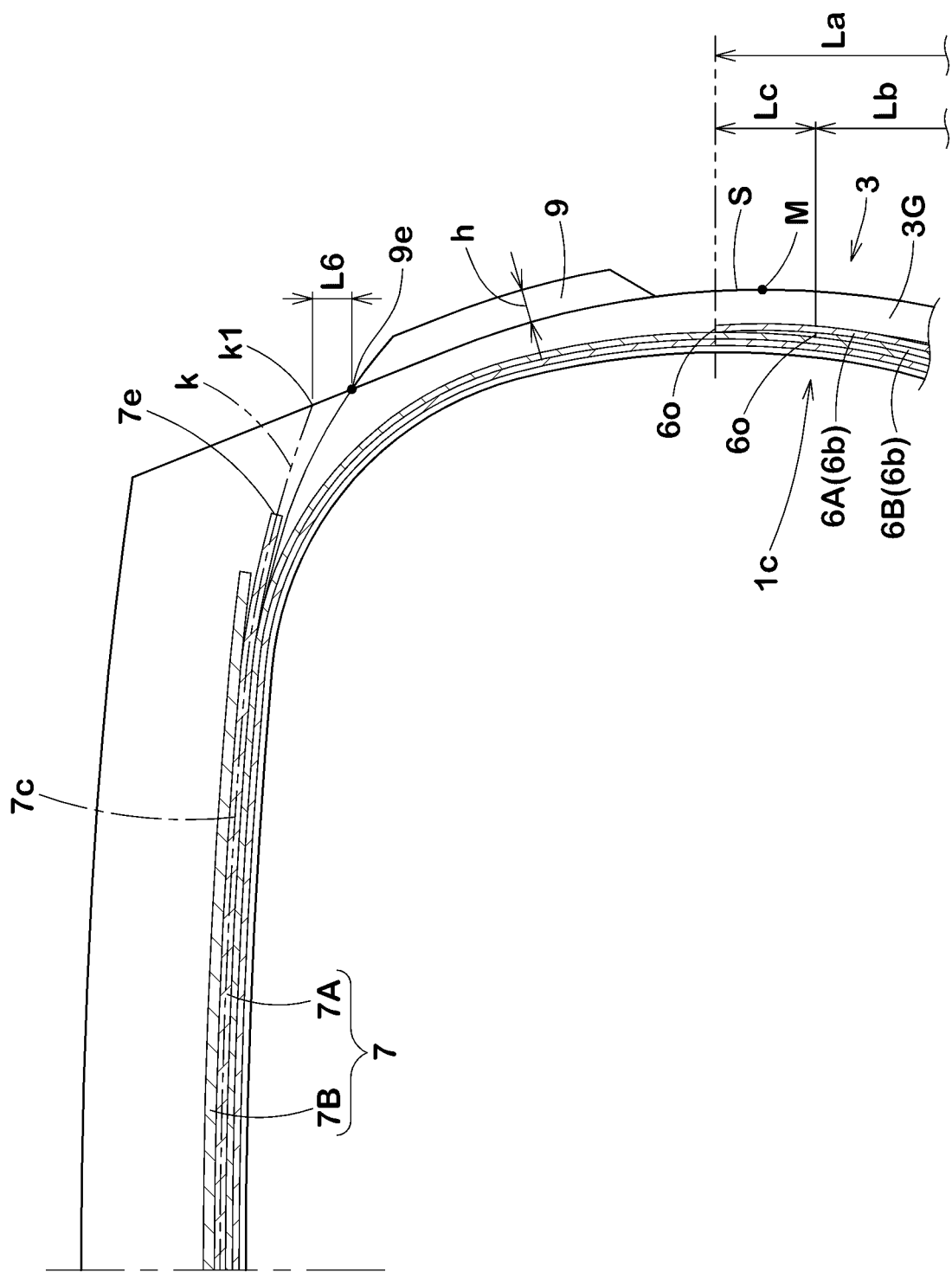
FIG. 3 is a partial enlarged view of the sidewall portion and a tread portion.

FIG. 3 illustrates a partial enlarged view of FIG. 1. As illustrated in FIG. 3, it is preferable that the side protector 9, for example, has a protruding height h of from 3 to 7 mm. When the protruding height h is less than 3 mm, the side protector 9 becomes small in stiffness, and thus it may be difficult to bend the tyre-maximum-width position M sufficiently. When the protruding height h exceeds 7 mm, the side protector 7 becomes large in rubber volume, and thus the side protector 9 tends to generate heat to excess upon driving, deteriorating durability as well as rolling resistance. Note that the "protruding height" is measured perpendicular to the profile line S.

It is not particularly limited to a shape of the side protector 9, but various aspect can be employed. Further, the side protector 9, in the present embodiment, is made of the same rubber as the sidewall rubber 3G. It is preferable that the sidewall rubber 3G had complex elastic modulus E3* of from 3.5 to 9.5 MPa.

In the present embodiment, the side protector 9 has an outer end 9e in the tyre radial direction located inwardly in the tyre radial direction of an extended line k in which the belt layer 7 is extended smoothly outwardly in the tyre axial direction while maintain a belt layer profile. The inventor has found that a portion around the axial outer ends 7e of the belt layer 7 upon driving generates heat to excess. Thus, positioning the outer end 9e of the side protector 9 at the above-mentioned location can avoid transmitting heat around the outer ends 7e of the belt layer 7 upon driving to the side protector 9, preventing deterioration of durability as well as rolling resistance. As used herein, the "extended line" is defined by extending the centerline 7c of the innermost belt ply 7A which is disposed innermost in the tyre radial direction smoothly (e.g. while maintaining the profile of the centerline).

In order to improve the above effect further, it is preferable that a distance L6 in the tyre radial direction between an intersection k1 of the extended line k to the profile line S and the outer end 9e of the side protector 9, for example, is equal to or more than 2% of the tyre section height H. When the distance L6 becomes longer, it may be difficult to improve cut resistance performance by the side protector 9. From the viewpoint, the distance L6 is preferably equal to or less than 10% of the tyre section height H.

It is preferable that a distance La in the tyre radial direction between at least one of the outer ends 6o of the turn-up portions 6b of the carcass 6 and the bead baseline BL is equal to or more than 50% of the tyre section height H. This aspect may offer high stiffness of the tyre middle region 1c, resulting in superior durability. In the present embodiment, the distance La in the tyre radial direction between the outer end 6o of the turn-up portion 6b of the first carcass ply 6A and the bead baseline BL is equal to or more than 50% of the tyre section height H. Note that a distance Lb in the tyre radial direction between the outer end 6o of the turn-up portions 6b of the second carcass ply 6B and the bead baseline BL may be equal to or more than 50% of the tyre section height H.

In each sidewall portion 3, the outer ends 6o of the turn-up portions 6b of the first carcass ply 6A and the second carcass ply 6B, respectively, are away from one another in the tyre radial direction, for example. This aspect enables to make the sidewall portion 3 small in stiffness difference, improving durability.

In the present embodiment, the tyre-maximum-width position M is located between the outer ends 6o of the first carcass ply 6A and the second carcass ply 6B in the tyre radial direction. This aspect may be useful to bend a portion around the tyre-maximum-width position M further. The outer end 6o of the second carcass ply 6B, in the present embodiment, is located inwardly in the tyre radial direction of the tyre-maximum-width position M. The outer ends 6o of the first and second carcass plies 6A and 6B, in the present embodiment, are located in the tyre middle region 1c.

In order to improve the above-mentioned effect further, a distance Lc in the tyre radial direction between the outer ends 6o of the first carcass ply 6A and the second carcass ply 6B is equal to or more than 15 mm, in each sidewall portion 3. Thus, the tyre middle region 1c varies in stiffness gradually. When the distance Lc becomes long excessively, the bead portions 4 becomes small in stiffness, or a region of the sidewall portion 3 where the side protector 9 is provided becomes greater in stiffness, deteriorating durability due to poor stiffness balance between the tyre inner region 1a and the tyre outer region 1b. Thus, the distance Lc is preferably equal to or less than 25 mm.

As illustrated in FIG.2, each bead portion 4 according to the present embodiment includes a chafer rubber 20 for preventing deviation with respect to a rim, and a reinforcing rubber layer 21 for improving stiffness of the bead portion 4.

In the present embodiment, the chafer rubber 20, for example, has a thin rubber sheet body having a thickness of from about 0.5 to 1.5 mm. The chafer rubber 20, for example, is made of a hard rubber composition with high wear resistance property having complex elastic modulus E*3 of from 4 to 10 MPa. The chafer rubber 20 may be configured as a rubber composition only. Alternatively, to improve wear resistance further, the chafer rubber 20 may be reinforced by a member, e.g., a canvas and/or a cord arrangement body of organic fiber cords.

The chafer rubber 20, in the present embodiment, includes a main portion 20A, an outer portion 20B, and an inner portion 20C. The main portion 20A, in the present embodiment, extends in the tyre axial direction so as to be in contact with a rim seat of the rim (not illustrated). The outer portion 20B, in the present embodiment, is connected to an axially outer end of the main portion 20A and extends outwardly in the tyre radial direction to its terminal end which is sandwiched between the turn-up portions 6b and the outer apex 12. The inner portion 20C, in the present embodiment, is connected to an axially inner end of the main portion 20A and extends outwardly in the tyre radial direction along the tyre inner surface to its terminal end.

The outer portion 20B, in the present embodiment, is sandwiched between the inner portion 6i of the turn-up portions 6b and the first portion 12A of the outer apex 12. The terminal end of the outer portion 20B is located inwardly in the tyre radial direction of the outer end 11e of the main apex 11. Such an outer portion 20B can prevent an excessive increase of stiffness of the tyre inner region 1a, and thus strain to be generated upon driving may be concentrated on and around the tyre-maximum-width position M.

The reinforcing rubber layer 21, in the present embodiment, is connected to the main apex 11 and extends outwardly in the tyre radial direction. The reinforcing rubber layer 21, for example, is sandwiched between the main portion 6a and the turn-up portions 6b. The reinforcing rubber layer 21 has an outer end 21e in the tyre radial direction located inwardly in the tyre radial direction of the outer end 12e of the outer apex 12.

The reinforcing rubber layer 21, in the present embodiment, has complex elastic modulus E*4 of from 25 to 85 MPa. The reinforcing rubber layer 21, for example, has a thickness t4 in a range of from 0.5 to 3.0 mm.

While the particularly preferable embodiments in accordance with the present disclosure have been described in detail, the present disclosure is not limited to the illustrated embodiments, but can be modified and carried out in various aspects.

EXAMPLE

Pneumatic tyres having the basic structure shown in FIG. 1 were manufactured by way of trial based on the detail shown in Table 1. Then, durability, cut resistance, appearance, and rolling resistance of each test tyre was tested. The common specification and the test method are as follows.

Tyre size: 275/65R16
Rim size: 18×7.5 J
Inner pressure: 240 kPa
Tyre-maximum-width position height in tyre radial direction from bead baseline: tyre section height H×0.5
Durability Test:
Using a drum tester, each test tyre was driven under the following condition: speed of 60 km/hr.; and tyre load of 14.35 kN. Then, runnable distance until damage occurs on either the sidewall portions or the bead portions was measured. The test results are shown in Table 1 using an index based on Ref 1 being 100. The larger value indicates the better performance.
Cut Resistance Test:
Each test tyre set was mounted onto all wheels of a passenger car having a displacement of 2500 cc. Then, a test driver drove the above passenger car on an off-road test course covered with rocks and debris for about 500 km. After driving, damage on the sidewall portions was evaluated based on the number of cuts as well as depths of the cuts. The test results are shown in Table 1 using marks based on Ref 1 being 100. The larger value indicates the better cut resistance.
Appearance Test:
A tester inspected the sidewall portions of each test tyre with naked eyes to evaluate its appearance. The test results are shown in Table 1 using marks based on Ref 1 being 100. The larger the value indicates the better cut resistance.
Rolling Resistance Test:
Using a rolling resistance testing machine, rolling resistance of each test tyre was measured under the following condition: speed of 80 km/h; and tyre load of 14.35 kN. The test results are shown in Table 1 using an index based on Ref 1 being 100. The smaller value indicates the smaller rolling resistance.

TABLE 1

|  | Ref. 1 | Ref. 2 | Ex. 1 | Ex. 2 | Ex. 3 | Ex. 4 | Ex. 5 |
| --- | --- | --- | --- | --- | --- | --- | --- |
| L1/L2 | 0.7 | 1.3 | 0.8 | 1.0 | 1.2 | 1.0 | 1.0 |
| Protruding height h (mm) | 5 | 5 | 5 | 5 | 5 | 1 | 3 |
| L5/H (%) | 15 | 15 | 15 | 15 | 15 | 15 | 15 |
| L6/H (%) | 6 | 6 | 6 | 6 | 6 | 6 | 6 |
| Durability [index] | 100 | 105 | 112 | 115 | 116 | 110 | 113 |
| Cut resistance [marks] | 100 | 93 | 103 | 105 | 106 | 97 | 100 |
| Appearance [score] | 100 | 100 | 100 | 100 | 100 | 97 | 99 |
| Rolling resistance [index] | 100 | 97 | 102 | 103 | 105 | 97 | 99 |

|  | Ex. 6 | Ex. 7 | Ex. 8 | Ex. 9 | Ex. 10 | Ex. 11 | Ex. 12 |
| --- | --- | --- | --- | --- | --- | --- | --- |
| L1/L2 | 1.0 | 1.0 | 1.0 | 1.0 | 1.0 | 1.0 | 1.0 |
| Protruding height h (mm) | 7 | 5 | 5 | 5 | 5 | 5 | 5 |
| L5/H (%) | 15 | 10 | 20 | 15 | 15 | 15 | 15 |
| L6/H (%) | 6 | 6 | 6 | 0 | 2 | 10 | 12 |
| Durability [index] | 115 | 110 | 112 | 112 | 115 | 117 | 118 |
| Cut resistance [marks] | 105 | 107 | 101 | 107 | 105 | 102 | 101 |
| Appearance [score] | 103 | 100 | 100 | 100 | 100 | 100 | 100 |
| Rolling resistance [index] | 105 | 100 | 97 | 105 | 104 | 101 | 98 |

From the test results, it is confirmed that the example tyres improve durability compared with the reference tyres.

What is claimed is:
1. A pneumatic tyre comprising:
a tread portion;
two axially spaced sidewall portions extending inwardly in a tyre radial direction from the tread portion, at least one of the sidewall portions being provided with a side protector that protrudes outwardly in a tyre axial direction, the side protector having an inner end in the tyre radial direction located outwardly in the tyre radial direction of a tyre-maximum-width position;

two axially spaced bead portions connected to inward in the tyre radial direction of the respective sidewall portions, each bead portion comprising a bead apex rubber, the bead apex rubber having an outer end in the tyre radial direction being located inwardly in the tyre radial direction of the tyre-maximum-width position; and a tyre middle region disposed between a tyre inner region and a tyre outer region, wherein a length in the tyre radial direction of the tyre inner region from a bead baseline to the outer end of each bead apex rubber is in a range of from 0.8 to 1.2 times a length in the tyre radial direction of the tyre outer region from an outermost position of the tread portion in the tyre radial direction to the inner end of the side protector, and wherein a length in the tyre radial direction of the tyre middle region is in a range of from 5% to 25% of the tyre section height.

2. The pneumatic tyre according to claim 1, wherein the tyre-maximum-width position is located on a middle region in the tyre radial direction of a tyre middle region which is a region between the tyre inner region and the tyre outer region.

3. The pneumatic tyre according to claim 1, wherein the tyre middle region has a difference of thickness between a maximum thickness thereof and a minimum thickness thereof being equal to or less than 15% of the maximum thickness.

4. The pneumatic tyre according to claim 1, wherein the bead portions comprise bead cores, and in each bead portion, the bead apex rubber comprises a main apex that extends outwardly in the tyre radial direction from an outer surface in the tyre radial direction of the bead core, and an outer apex disposed outwardly in the tyre axial direction of the main apex.

5. The pneumatic tyre according to claim 4, wherein the outer apex has an outer end in the tyre radial direction located outwardly in the tyre radial direction of an outer end in the tyre radial direction of the main apex.

6. The pneumatic tyre according to claim 5, further comprising at least one carcass ply extending between the bead portions, wherein the at least one carcass ply, in each bead portion, extends between the main apex and the outer apex.

7. The pneumatic tyre according to claim 6, wherein the at least one carcass ply comprises a main portion extending between the bead cores of the bead portions through the tread portion and the sidewall portions, and axially spaced two turn-up portions turned up around the respective bead cores from axially inside to the outside of the tyre, and lengths in the tyre radial direction between outer ends in the tyre radial direction of the turn-up portion and the bead base line are equal to or less than 50% of a tyre section height.

8. The pneumatic tyre according to claim 6, wherein the at least one carcass ply comprises a first carcass ply and a second carcass ply arranged adjacently on the first carcass ply, and wherein in each bead portion, the outer end of the turn-up portion of the first carcass ply is away from the outer end of the turn-up portion of the second carcass ply in the tyre radial direction.

9. The pneumatic tyre according to claim 8, wherein in each bead portion, the tyre-maximum-width position is located between the outer end of the first carcass ply and the outer end of the second carcass ply in the tyre radial direction.

10. The pneumatic tyre according to claim 8, wherein in each bead portion, a distance in the tyre radial direction between the outer ends of the first carcass ply and the second carcass ply is equal to or more than 15 mm.

11. The pneumatic tyre according to claim 7, wherein under a normal condition such that the tyre is mounted on a standard wheel rim and inflated to a standard pressure but loaded with no tyre load, the carcass ply has a single radius curvature profile in a radial region between a first height position and a second height position, where the first height position is defined as a position away from the tyre-maximum-width position outwardly in the tyre radial direction at a radial length that is twice of a radial length from the inner end of the side protector to the tyre-maximum-width position, and the second height position is defined as a position away from the tyre-maximum-width position inwardly in the tyre radial direction at a radial length that is twice of a radial length from the outer end of the bead apex rubber to the tyre-maximum-width position.

12. The pneumatic tyre according to claim 1, wherein the tread portion comprises a belt layer extending in the tyre axial direction, and wherein the side protector has an outer end in the tyre radial direction located inwardly in the tyre radial direction of an extended line in which the belt layer is extended smoothly outwardly in the tyre axial direction.

13. The pneumatic tyre according to claim 1, wherein the side protector has a protruding height of from 3 to 7 mm.

14. The pneumatic tyre according to claim 2, wherein a tyre middle region which is a region between the tyre inner region and the tyre outer region has a difference of thickness between a maximum thickness thereof and a minimum thickness thereof being equal to or less than 15% of the maximum thickness.

15. The pneumatic tyre according to claim 2, wherein the bead portions comprise bead cores, and in each bead portion, the bead apex rubber comprises a main apex that extends outwardly in the tyre radial direction from an outer surface in the tyre radial direction of the bead core, and an outer apex disposed outwardly in the tyre axial direction of the main apex.

16. The pneumatic tyre according to claim 3, wherein the bead portions comprise bead cores, and in each bead portion, the bead apex rubber comprises a main apex that extends outwardly in the tyre radial direction from an outer surface in the tyre radial direction of the bead core, and an outer apex disposed outwardly in the tyre axial direction of the main apex.

17. The pneumatic tyre according to claim 1, wherein the tyre middle region has a length in the tyre radial direction in a range of from 10% to 20% of the tyre section height.

18. A pneumatic tyre comprising:

a tread portion which comprises a belt layer extending in the tyre axial direction;

two axially spaced sidewall portions extending inwardly in a tyre radial direction from the tread portion, at least one of the sidewall portions being provided with a side protector that protrudes outwardly in a tyre axial direction, the side protector having an inner end in the tyre radial direction located outwardly in the tyre radial direction of a tyre-maximum-width position; and two axially spaced bead portions connected to inward in the tyre radial direction of the respective sidewall portions, each bead portion comprising a bead apex rubber, the bead apex rubber having an outer end in the tyre radial direction being located inwardly in the tyre radial direction of the tyre-maximum-width position;

wherein a length in the tyre radial direction of a tyre inner region from a bead baseline to the outer end of each bead apex rubber is in a range of from 0.8 to 1.2 times a length in the tyre radial direction of a tyre outer region from an outermost position of the tread portion in the tyre radial direction to the inner end of the side protector, the side protector has an outer end in the tyre radial direction located inwardly in the tyre radial direction of an extended line in which the belt layer is extended smoothly outwardly in the tyre axial direction, and a distance in the tyre radial direction between an intersection of the extended line to a profile line of the at least one of the sidewall portions and the outer end of the side protector is in a range of 2% to 10% of the tyre section height.

\* \* \* \* \*